(12) United States Patent
Kurihara et al.

(10) Patent No.: US 11,913,367 B2
(45) Date of Patent: *Feb. 27, 2024

(54) EXHAUST GAS PURIFICATION CATALYST

(71) Applicants: Mitsui Mining & Smelting Co., Ltd., Tokyo (JP); HONDA MOTOR CO., LTD., Tokyo (JP)

(72) Inventors: Hiroki Kurihara, Saitama (JP); Yusuke Nagai, Saitama (JP); Shingo Akita, Saitama (JP); Yoshinori Endo, Saitama (JP); Takeshi Mori, Saitama (JP); Takayuki Watanabe, Saitama (JP); Tomoko Tsuyama, Saitama (JP)

(73) Assignees: Mitsui Mining & Smelting Co., Ltd., Tokyo (JP); HONDA MOTOR CO., LTD., Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 17/046,584

(22) PCT Filed: Apr. 17, 2019

(86) PCT No.: PCT/JP2019/016537
§ 371 (c)(1),
(2) Date: Oct. 9, 2020

(87) PCT Pub. No.: WO2020/039650
PCT Pub. Date: Feb. 27, 2020

(65) Prior Publication Data
US 2021/0164377 A1 Jun. 3, 2021

(30) Foreign Application Priority Data
Aug. 22, 2018 (JP) .................................. 2018-155776

(51) Int. Cl.
*B01J 23/44* (2006.01)
*B01J 23/46* (2006.01)
(Continued)

(52) U.S. Cl.
CPC ............ *F01N 3/2821* (2013.01); *B01J 23/63* (2013.01); *B01J 35/04* (2013.01); *F01N 3/2828* (2013.01); *B01J 35/10* (2013.01)

(58) Field of Classification Search
CPC ... B01J 23/63; B01J 35/04; B01J 35/10; B01J 23/44; B01J 23/464; F01N 3/2821; F01N 3/2828
(Continued)

(56) References Cited

U.S. PATENT DOCUMENTS 8,802,016 B2 * 8/2014 Grubert .................... B01J 35/04
422/177
9,145,809 B2 * 9/2015 Boorse .................... F01N 3/101
(Continued)

FOREIGN PATENT DOCUMENTS

| CN | 103201018 A | 7/2013 |
| CN | 103201019 A | 7/2013 |

(Continued)

OTHER PUBLICATIONS

International Search Report (ISR) dated Jul. 30, 2019 filed in PCT/JP2019/016537.

*Primary Examiner* — Cam N. Nguyen
(74) *Attorney, Agent, or Firm* — RANKIN, HILL & CLARK LLP

(57) ABSTRACT

There is provided an exhaust gas purifying catalyst including a substrate and catalyst portions. The substrate includes an inflow-side cells, outflow-side cells, and porous partition walls, each partition wall separating the inflow-side cell from the outflow-side cell. The catalyst portion includes:
(Continued)

(group A) first catalyst portions, each first catalyst portion being provided on a surface of the partition wall that faces the inflow-side cell on an upstream side in an exhaust gas flow direction; and (group B) second catalyst portions being provided on a surface of the partition wall that faces the outflow-side cell on a downstream side in the exhaust gas flow direction. Each catalyst portion of one of group A and group B includes at least one oxidizing catalyst layer and at least one reducing catalyst layer, and each catalyst portion of the other of group A and group B includes at least one oxidizing catalyst layer and/or at least one reducing catalyst layer.

7 Claims, 3 Drawing Sheets

(51) Int. Cl.
  *B01J 23/63* (2006.01)
  *B01J 35/04* (2006.01)
  *B01J 35/10* (2006.01)
  *F01N 3/28* (2006.01)

(58) Field of Classification Search
  USPC ........ 502/258–262, 332–334, 339, 355, 415, 502/439, 527.12, 527.13
  See application file for complete search history.

(56) References Cited

U.S. PATENT DOCUMENTS

| | | | |
|---|---|---|---|
| 10,018,095 B2* | 7/2018 | Nomura | F01N 3/035 |
| 10,125,649 B2* | 11/2018 | Onoe | B01J 35/04 |
| 10,159,935 B2* | 12/2018 | Onoe | B01J 35/04 |
| 10,183,253 B2* | 1/2019 | Onoe | B01J 23/63 |
| 10,201,805 B2* | 2/2019 | Ohashi | B01J 21/066 |
| 10,344,655 B2* | 7/2019 | Onoe | F01N 3/28 |
| 10,357,744 B2* | 7/2019 | Ohashi | B01D 53/94 |
| 10,688,476 B2* | 6/2020 | Onoe | B01J 23/44 |
| 11,097,260 B2* | 8/2021 | Kurihara | B01J 37/0018 |
| 11,154,847 B2* | 10/2021 | Patchett | F01N 3/2066 |
| 11,266,982 B2* | 3/2022 | Kurihara | B01J 21/066 |
| 11,433,377 B2* | 9/2022 | Nagai | B01D 46/24492 |
| 2010/0061900 A1 | 3/2010 | Watanabe et al. | |
| 2010/0275579 A1 | 11/2010 | Klingmann et al. | |
| 2011/0030346 A1 | 2/2011 | Neubauer et al. | |
| 2012/0128558 A1 | 5/2012 | Nunan et al. | |
| 2012/0304623 A1 | 12/2012 | Springer et al. | |
| 2013/0287660 A1 | 10/2013 | Nunan et al. | |
| 2017/0296969 A1 | 10/2017 | Ohashi et al. | |
| 2018/0038252 A1 | 2/2018 | Yang et al. | |
| 2019/0240643 A1* | 8/2019 | Karpov | B01J 23/44 |
| 2021/0001315 A1 | 1/2021 | Kurihara et al. | |
| 2021/0283580 A1* | 9/2021 | Zheng | B01J 35/1019 |
| 2022/0401939 A1* | 12/2022 | Nagai | B01J 35/04 |
| 2023/0029275 A1* | 1/2023 | Nagai | B01J 35/0006 |

FOREIGN PATENT DOCUMENTS

| | | |
|---|---|---|
| CN | 106794421 A | 5/2017 |
| EP | 3207989 A1 | 8/2017 |
| JP | 2007-252997 A | 10/2007 |
| JP | 2008-253961 A | 10/2008 |
| JP | 2010-540217 A | 12/2010 |
| JP | 2015-25435 A | 2/2015 |
| JP | 2018-513784 A | 5/2018 |

\* cited by examiner

EXHAUST GAS PURIFICATION CATALYST

CROSS-REFERENCE TO RELATED APPLICATIONS:

This application is a National Phase Application of International Application No. PCT/JP2019/016537, filed Apr. 17, 2019, which claims the priority of Japan Patent Application No. 2018-155776, filed Aug. 22, 2018. The present application claims priority from both applications and each of these applications is herein incorporated in their entirety by reference.

TECHNICAL FIELD

The present invention relates to an exhaust gas purifying catalyst.

BACKGROUND ART

For internal combustion engines including gasoline engines, gasoline direct injection engines (hereinafter also referred to as GDI engines) are now widely used in order to comply with fuel economy standards becoming stricter year by year. It is known that GDI engines have low fuel consumption and provide high output, but that the amount of particulate matter (hereinafter also referred to as PM; including soot) emitted in exhaust gas is 5 to 10 times or more higher than that of conventional port fuel injection engines. In order to comply with environmental restrictions for PM emission, vehicles mounted with a gasoline engine such as a GDI engine are also required to include a filter that has a function for collecting PM (gasoline particulate filter, hereinafter also referred to as GPF), as with diesel engine-mounted vehicles.

In general, the space for installing an exhaust gas purifying catalyst in vehicles is limited, and thus, in view of space-saving, an exhaust gas purifying catalyst has come into use in recent years that includes a filter as described above and a noble metal three-way catalyst component such as Pd, Pt, or Rh supported on the filter to collect PM and purify nitrogen oxide ($NO_x$), carbon monoxide (CO), hydrocarbon (HC), and the like.

For example, Patent Literature 1 discloses a treatment system for a gasoline engine exhaust gas stream including a particulate filter, the particulate filter including a particulate filter substrate, an inlet layer disposed on the exhaust gas inlet surface of the filter substrate, and an outlet layer disposed on the exhaust gas outlet surface of the filter substrate, wherein the inlet layer includes Rh and/or Pd and the outlet layer includes Rh and/or a zeolite.

CITATION LIST

Patent Literature

Patent Literature 1: US 20110030346A1

SUMMARY OF INVENTION

Technical Problem

However, for a conventional filter catalyst that supports a noble metal three-way catalyst component, there is demand for a technique that enables even better exhaust gas purification performance while reducing the amount of noble metal used.

It is an object of the present invention to provide an exhaust gas purifying catalyst of wall-flow type that has better exhaust gas purification performance than a conventional exhaust gas purifying catalyst.

Solution to Problem

The inventors of the present invention have conducted in-depth studies on the configuration of a filter catalyst that has a wall flow structure. As a result, they have found that a filter catalyst that has better exhaust gas purification performance than a conventional filter catalyst can be obtained by arranging an oxidizing catalyst layer and a reducing catalyst layer under specific conditions on an inlet side and an outlet side of a substrate.

The present invention has been made based on the findings described above, and provides an exhaust gas purifying catalyst including a substrate and catalyst portions provided in the substrate, the substrate including:
  inflow-side cells, each inflow-side cell being a space having an open end on an inflow side thereof and a closed end on an outflow side thereof in an exhaust gas flow direction;
  outflow-side cells, each outflow-side cell being a space having a closed end on an inflow side thereof and an open end on an outflow side thereof in the exhaust gas flow direction; and
  porous partition walls, each partition wall separating the inflow-side cell from the outflow-side cell, and
the catalyst portions including:
  (group A) first catalyst portions, each first catalyst portion being provided at least on the upstream side in the exhaust gas flow direction on a part of a surface of the partition wall that faces the inflow-side cell; and
  (group B) second catalyst portions, each second catalyst portion being provided at least on the downstream side in the exhaust gas flow direction on a part of a surface of the partition wall that faces the outflow-side cell,
wherein each catalyst portion of one of group A and group B includes at least one oxidizing catalyst layer and at least one reducing catalyst layer, and
each catalyst portion of the other of group A and group B includes at least one oxidizing catalyst layer and/or at least one reducing catalyst layer.

Advantageous Effects of Invention

According to the present invention, a filter catalyst is provided that has superior exhaust gas purification performance to that of a conventional filter catalyst.

DESCRIPTION OF EMBODIMENT

Hereinafter, the present invention will be described by way of preferred embodiments thereof, but the present invention is not limited to the embodiments given below.

FIGS. 1 to 5 show an example of an exhaust gas purifying catalyst 10 according to the present embodiment. The drawings merely show a schematic example of an exhaust gas purifying catalyst, and are not intended to limit the present invention in any way.

The exhaust gas purifying catalyst 10 is provided in an exhaust path of an internal combustion engine such as a gasoline engine, in particular, a GDI engine for vehicles. The exhaust gas purifying catalyst 10 is used as, for example, a GPF.

Figure 1:
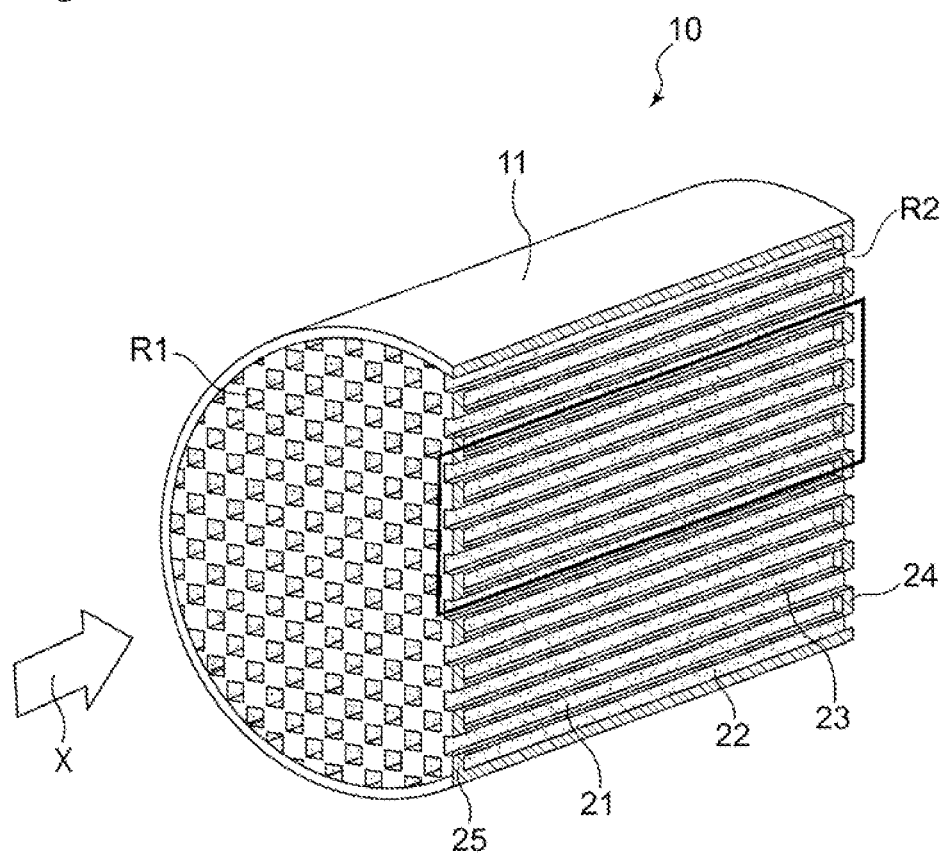
FIG. 1 is a schematic cross-sectional perspective view of an exhaust gas purifying catalyst according to an embodiment of the present invention.

As shown in FIG. 1, the exhaust gas purifying catalyst 10 includes a substrate 11 that has a so-called wall flow structure. As the substrate 11, a substrate made of any material can be used. For example, a substrate formed of ceramic such as cordierite or silicon carbide (SiC) can be favorably used. Usually, the substrate has a column-like outer shape as shown in FIG. 1, and is disposed in the exhaust path of the internal combustion engine such that the axis direction of the column-like outer shape substantially matches an exhaust gas flow direction X. FIG. 1 shows a substrate that has a cylindrical column-like outer shape. However, the outer shape of the substrate as a whole may be an elliptic column-like shape or a polygonal column-like shape, instead of a cylindrical column-like shape.

As shown in FIG. 1, the substrate 11 includes inflow-side cells 21 and outflow-side cells 22. Each inflow-side cell 21 is a space, the space extending in the exhaust gas flow direction X and having an open end on the inflow side thereof and a closed end on the outflow side thereof in the flow direction X. Each outflow-side cell 22 is a space, the space extending in the flow direction X and having a closed end on the inflow side thereof and an open end on the outflow side thereof in the flow direction X.

The inflow-side cell 21 and the outflow-side cell 22 have the shape of a hole with a bottom. The inflow-side cell 21 is closed by a sealing portion 24 at the end on the exhaust gas outflow-side in a downstream end portion R2 in the exhaust gas flow direction X, but is open at the end on the exhaust gas inflow-side in an upstream end portion R1. The outflow-side cell 22 is closed by a sealing portion 25 at the end on the exhaust gas inflow-side in the upstream end portion R1, but is open at the end on the exhaust gas outflow-side in the downstream end portion R2. The inflow-side cell 21 and the outflow-side cell 22 are configured such that a gas, a liquid, and the like can flow through an opening end (hereinafter also referred to as "opening"), but the flow of exhaust gas is blocked at the sealing portion 24 and the sealing portion 25, which are closed portion. The inflow-side cell 21 and the outflow-side cell 22 are each a space having the shape of a hole with a bottom and extending in the axis direction of the substrate 11. The cross-sectional shape of each of the inflow-side cell 21 and the outflow-side cell 22 on a cross section perpendicular to the axis direction of the substrate 11 may be any geometric shape such as a quadrilateral including a square, a parallelogram, a rectangle, and a trapezoid, a polygon including a triangle, a hexagon, and an octagon, a circular shape, and an elliptic shape.

An inflow-side cell 21 and an outflow-side cell 22 that is provided adjacent to the inflow-side cell 21 are separated by a porous partition wall 23. The partition wall 23 serves as a side wall of the inflow-side cell 21 and the outflow-side cell 22. The partition wall 23 has a porous structure to allow a gas such as exhaust gas to pass therethrough. The thickness of the partition wall 23 is preferably 150 μm to 400 μm, for example. As used herein, the term "thickness" refers to the thickness of a thinnest portion when the partition wall 23 between the inflow-side cell 21 and the outflow-side cell 22 does not have a uniform thickness.

In the substrate 11, the opening of one inflow-side cell 21 at the inflow-side end portion R1 and the opening of one outflow-side cell 22 at the outflow-side end portion R2 may have the same area or different areas. As used herein, the area of the opening refers to the area on a plane that is perpendicular to the axis direction of the substrate 11.

Figure 2:
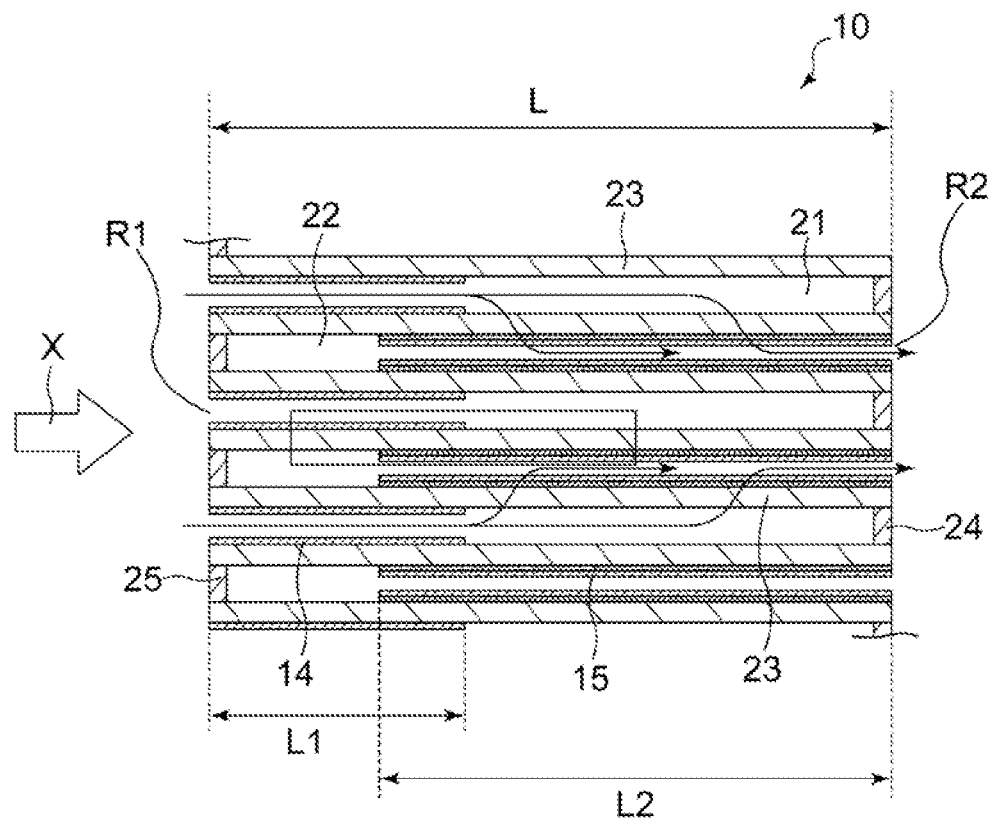
FIG. 2 is a cross section of a portion surrounded by a rectangle in FIG. 1, taken along the axis direction of a substrate.

In the substrate 11, catalyst portions containing a catalytically active component are provided. As shown in FIG. 2, the catalyst portions include: first catalyst portions 14, each first catalyst portion 14 being in the form of a layer and provided at least on the upstream side in the exhaust gas flow direction X (hereinafter also referred to as "X direction") on the surface of the partition wall 23 that faces the inflow-side cell 21 (herein, the first catalyst portions are also collectively referred to as group A), and second catalyst portions 15, each second catalyst portion 15 being in the form of a layer and provided at least on the downstream side in the exhaust gas flow direction X on the surface of the partition wall 23 that faces the outflow-side cell 22 (herein, the second catalyst portions are also collectively referred to as group B). The hatching in FIGS. 2 to 5 does not limit the positions of an oxidizing catalyst layer and a reducing catalyst layer, which will be described later.

In the exhaust gas purifying catalyst 10, exhaust gas flows into the inflow-side cell 21 of the substrate 11, as shown in FIG. 2. The exhaust gas flowing into the inflow-side cell 21 passes through the porous partition wall 23 and reaches the outflow-side cell 22. In FIG. 2, a path along which the exhaust gas flowing into the inflow-side cell 21 passes through the partition wall 23 and reaches the outflow-side cell 22 is indicated by an arrow. Since the partition wall 23 has a porous structure, PM is collected on the surfaces of the partition wall 23 and in the pores inside the partition wall 23 while the exhaust gas passes through the partition wall 23. Moreover, while the exhaust gas passes through the inside of and the surfaces of the partition wall 23, the exhaust gas comes into contact with a catalytically active component of the first catalyst portion 14 and the second catalyst portion 15, and harmful components in the exhaust gas are thus purified. The exhaust gas passing through the partition wall 23 and reaching the outflow-side cell 22 is then discharged from the opening of the outflow-side cell 22 to the outside of the exhaust gas purifying catalyst 10.

In the present embodiment, each catalyst portion of one of group A (the first catalyst portions 14) and group B (the second catalyst portions 15) includes at least one oxidizing catalyst layer and at least one reducing catalyst layer, and each catalyst portion of the other of group A and group B includes either one or both of at least one oxidizing catalyst layer and at least one reducing catalyst layer.

An oxidizing catalyst layer refers to a catalyst layer that contains mainly an oxidation catalyst among catalytically active components. Here, the oxidation catalyst is a catalyst having properties such that its catalytic effect of oxidizing hydrocarbon (HC) and carbon monoxide (CO) is greater than its catalytic effect of reducing $NO_x$ (nitrogen oxide). One or two selected from palladium (Pd) and platinum (Pt) may be used as the oxidation catalyst. On the other hand, a reducing catalyst layer refers to a catalyst layer that contains mainly a reduction catalyst among catalytically active components. Here, the reduction catalyst is a catalyst having properties such that its catalytic effect of reducing $NO_x$ (nitrogen oxide) is greater than its catalytic effect of oxidizing hydrocarbon (HC) and carbon monoxide (CO). Rhodium (Rh) may be used as the reduction catalyst.

The oxidizing catalyst layer may also contain a reduction catalyst and other catalytically active components in addition to an oxidation catalyst, but the amount of the oxidation catalyst is larger than the total amount of the reduction catalyst and the other catalytically active components. The "amount" here refers to an amount in terms of a metal element on a mass basis. In particular, the proportion of the sum of the amounts of Pd and Pt as the oxidation catalyst is more preferably higher than 50 mass % based on the total amount of catalytically active components contained in the oxidizing catalyst layer. The other catalytically active components as used herein refer to components other than the oxidation catalyst and the reduction catalyst described above, and may be one or more selected from ruthenium (Ru), iridium (Ir), osmium (Os), gold (Au), and silver (Ag).

The reducing catalyst layer may also contain an oxidation catalyst and other catalytically active components in addition to a reduction catalyst, but the amount of the reduction catalyst is larger than the total amount of the oxidation catalyst and the other catalytically active components. The "amount" as used herein refers to an amount in terms of a metal element on a mass basis. In particular, the proportion of the amount of Rh as the reduction catalyst is more preferably higher than 50 mass % based on the total amount of catalytically active components contained in the reducing catalyst layer. The other catalytically active components as used herein include the above-described components as well as Pt and Pd.

In the present embodiment, each catalyst portion of one of group A (the first catalyst portions 14) and group B (the second catalyst portions 15) includes at least one oxidizing catalyst layer and at least one reducing catalyst layer, and each catalyst portion of the other of group A and group B includes either one or both of at least one oxidizing catalyst layer and at least one reducing catalyst layer. That is to say, in the exhaust gas purifying catalyst 10 of the present embodiment, each catalyst portion of one of group A and group B includes both an oxidizing catalyst layer and a reducing catalyst layer, whereas each catalyst portion of the other of group A and group B includes at least one selected from the group consisting of an oxidizing catalyst layer and a reducing catalyst layer. By such a configuration, the exhaust gas purifying catalyst 10 allows exhaust gas to come into contact with a total of three or more of the oxidizing catalyst layer and the reducing catalyst layer. Although the mechanism of improving exhaust gas purification performance by such a configuration is not clear, the inventors of the present invention consider that one of the reasons might be that the increase in probability of exhaust gas coming into contact with an oxidizing catalyst layer or a reducing catalyst layer activates the oxidation/reduction reaction in the oxidizing catalyst layer or/and the reducing catalyst layer.

In the exhaust gas purifying catalyst 10 of the present embodiment, when an oxidizing catalyst layer and a reducing catalyst layer are stacked, the following configuration may be adopted: an oxidizing catalyst layer is first formed on the partition wall 23 and a reducing catalyst layer is then formed on the oxidizing catalyst layer; or alternatively, a reducing catalyst layer is first formed on the partition wall 23 and an oxidizing catalyst layer is then formed on the reducing catalyst layer. The oxidizing catalyst layer or the reducing catalyst layer that is formed on the partition wall 23 may be formed on the partition wall 23 so as to be in direct contact with the partition wall 23 or may be formed on the partition wall 23 via an intermediate layer. The intermediate layer does not contain a catalytically active component and may be, for example, a layer that is formed mainly of metal oxide particles, which will be described later. As described above, the expression "a predetermined catalyst layer is formed on the partition wall 23" as used herein includes a case where the catalyst layer is formed on a surface of the partition wall 23 and a case where the catalyst layer is formed on an outer side of the partition wall 23 on a surface side of the partition wall 23. Likewise, the expression "a catalyst layer B is stacked on a catalyst layer A" includes a case where the catalyst layer B is formed on a surface of the catalyst layer A and a case where the catalyst layer B is formed on an outer side of the catalyst layer A on a surface side of the catalyst layer A. Hereinafter, in a stacking structure composed of an oxidizing catalyst layer and a reducing catalyst layer that are provided on the partition wall 23, a layer that is located closer to the partition wall 23 will also be referred to as a "lower layer", and a layer that is formed on the other side of the "lower layer" than the partition wall 23-side will also be referred to as an "upper layer". In general, an oxidizing catalyst layer or a reducing catalyst layer that is provided in direct contact with the partition wall 23 may be present inside the partition wall 23 or may be present on the surface of the partition wall 23, depending on the particle diameter and the other features of constituent particles of that catalyst layer. In a stack of an oxidizing catalyst layer and a reducing catalyst layer in the first catalyst portion 14, the boundary between the oxidizing catalyst layer and the reducing catalyst layer is preferably located over a surface of the partition wall 23 that faces the inflow-side cell 21, rather than being located inside the partition wall 23. Likewise, in a stack of an oxidizing catalyst layer and a reducing catalyst layer in the second catalyst portion 15, the boundary between the oxidizing catalyst layer and the reducing catalyst layer is preferably located over a surface of the partition wall 23 that faces the outflow-side cell 22, rather than being located inside the partition wall 23.

Whether or not a catalyst layer is in direct contact with the partition wall 23 can be checked in the following manner: the catalyst 10 is cut along a cross section that is perpendicular to the exhaust gas flow direction; the exposed cross section is observed using a scanning electron microscope (for example, "JEM-ARM200F" available from JEOL, Ltd.); and also energy dispersive X-ray spectrometry (EDS) is performed thereon to line-analyze the distribution of elements (for example, Si and Mg) that are present only in the substrate and the distribution of elements (for example, Pd, Pt, and Rh) that are present only in the catalyst layer. Alternatively, that can also be checked by analyzing the cross section using an electron probe micro analyzer (EPMA). The catalyst including the substrate is cut using a band saw or the like. The catalyst that has been cut is embedded in an epoxy resin to prepare a sample in which the above-described cross section is exposed on the surface thereof. It can be checked in the same manner as above whether or not the layer boundary between an oxidizing catalyst layer and a reducing catalyst layer in a stack of the oxidizing catalyst layer and the reducing catalyst layer is located over a surface of the partition wall 23 that faces the cell 21 or 22 rather than being located inside the partition wall 23.

In order to locate the boundary between the lower layer and the upper layer over a surface of the partition wall 23 that faces the cell 21 or 22, metal oxide particles having a particle diameter that makes it difficult for the particles to pass through the pores of the partition wall can be used as catalyst-supporting metal oxide particles for the lower catalyst layer, or a pore-forming material having a particle diameter that makes it difficult for the material to pass through the pores of the partition wall can be included in a slurry for forming the lower layer.

In a stack of an oxidizing catalyst layer and a reducing catalyst layer, the total number of oxidizing catalyst layers and reducing catalyst layers is 2 or more. The total number of oxidizing catalyst layers and reducing catalyst layers in the first catalyst portion 14 and the second catalyst portion 15 is preferably 4 or less, and more preferably 3 or less, in view of the production cost of the exhaust gas purifying catalyst 10 and the prevention of pressure loss. If oxidizing catalyst layers are stacked with no reducing catalyst layer provided therebetween, the number of such oxidizing catalyst layers is counted as 1, and not as 2 or more. Likewise, if reducing catalyst layers are stacked with no oxidizing catalyst layer provided therebetween, the number of such reducing catalyst layers is counted as 1, and not as 2 or more. Herein, one catalyst layer (also referred to as "a single (catalyst) layer") does not need to have a uniform composition. When viewed in the thickness direction, a single catalyst layer may include portions containing different catalytically active components, as long as these portions have the same tendency in terms of which of the oxidizing properties and the reducing properties are the stronger.

When one of the first catalyst portion 14 and the second catalyst portion 15 includes a stack of an oxidizing catalyst layer and a reducing catalyst layer, the other of the first catalyst portion 14 and the second catalyst portion 15 may be a single oxidizing catalyst layer, a single reducing catalyst layer, or a stack of an oxidizing catalyst layer and a reducing catalyst layer.

The number of layers of a stacking structure in each of the first catalyst portion 14 and the second catalyst portion 15 can be determined by analyzing the distributions of the reduction catalyst component(s) and the oxidation catalyst component(s) through line-analysis (Pd, Pt, Rh, and the like) using EDS or the like.

In a preferred embodiment of the present invention, the total number of the oxidizing catalyst layer(s) and the reducing catalyst layer(s) included in the first catalyst portion 14 is different from the total number of the oxidizing catalyst layer(s) and reducing catalyst layer(s) included in the second catalyst portion 15. When the first catalyst portion 14 (or the second catalyst portion 15) includes only a single oxidizing catalyst layer or only a single reducing catalyst layer, the total number of layers herein is 1.

Figure 3:
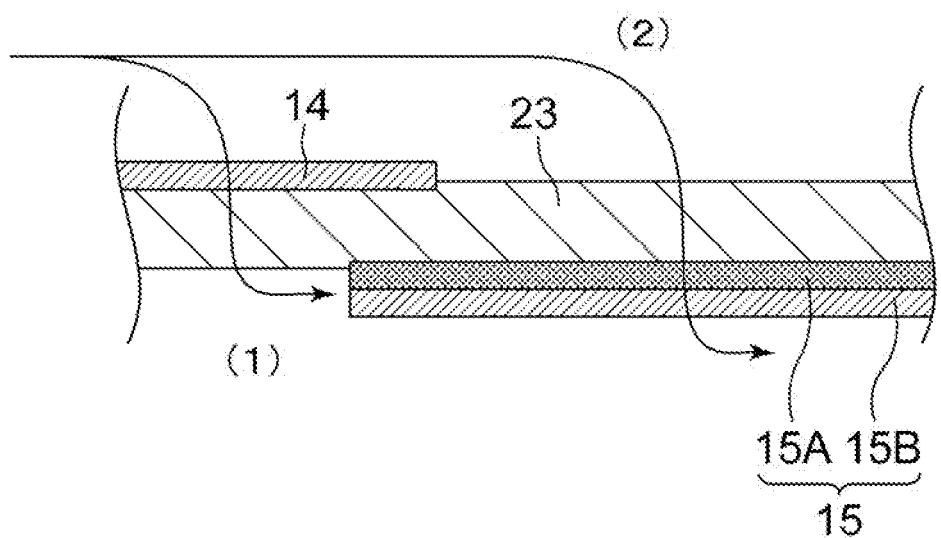
FIG. 3 is an enlarged view of a portion surrounded by a rectangle in FIG. 2.
Figure 4:
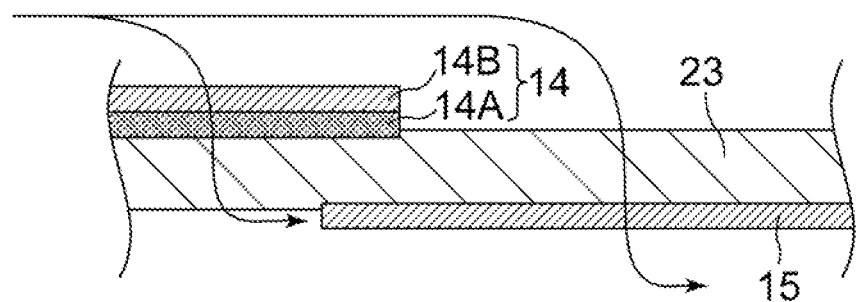
FIG. 4 is a partial enlarged view of a cross section of an exhaust gas purifying catalyst according to another embodiment.

When the total number of the oxidizing catalyst layer(s) and the reducing catalyst layer(s) included in the first catalyst portion 14 is different from the total number of the oxidizing catalyst layer(s) and the reducing catalyst layer(s) included in the second catalyst portion 15, the catalyst portion including the smaller number of layers contributes to reducing pressure loss, while the catalyst portion including the larger number of layers contributes to improving exhaust gas purification performance, and it is therefore easy to provide both a reduction in pressure loss and an improvement in purification performance. A preferred configuration in this case may be as follows: one of the first catalyst portion 14 and the second catalyst portion 15 consists of a single reducing catalyst layer or a single oxidizing catalyst layer and the other of the first catalyst portion 14 and the second catalyst portion 15 is a stack of two or more layers including an oxidizing catalyst layer and a reducing catalyst layer. FIGS. 3 and 4 show examples of such a configuration.

In a configuration shown in FIG. 3, the first catalyst portion 14 consists of a single reducing catalyst layer or a single oxidizing catalyst layer and the other catalyst portion is a stack of two or more layers including an oxidizing catalyst layer and a reducing catalyst layer. When adopting this configuration, both the exhaust gas (1) passing through the first catalyst portion 14 and the gas (2) passing through the partition wall 23 downstream of the first catalyst portion 14 in the X direction can come into contact with the second catalyst portion 15, which is a stack of two or more layers. Accordingly, this configuration can provide an increased probability of contact of exhaust gas with both an oxidizing catalyst layer and a reducing catalyst layer. Also, a configuration shown in FIG. 4, in which both an oxidizing catalyst layer and a reducing catalyst layer are disposed on the inflow side, can provide an increased probability of exhaust gas with an oxidizing catalyst layer or a reducing catalyst layer, compared with a conventional configuration, in which only one catalyst layer is disposed on each of the inflow side and the discharge side.

When the total number of the reducing catalyst layer(s) and the oxidizing catalyst layer(s) included in the first catalyst portion 14 is different from the total number of the reducing catalyst layer(s) and the oxidizing catalyst layer(s) included in the second catalyst portion 15, the total number of the layers of the second catalyst portion 15 is preferably larger than the total number of the layers of the first catalyst portion 14. The reason for this is that exhaust gas purification performance can be even more readily improved with limited amounts of the catalytically active components, and also that an increase in pressure loss can also be readily suppressed. Moreover, the advantage of suppressing an increase in pressure loss after PM and ash have accumulated can also be provided.

Figure 5:
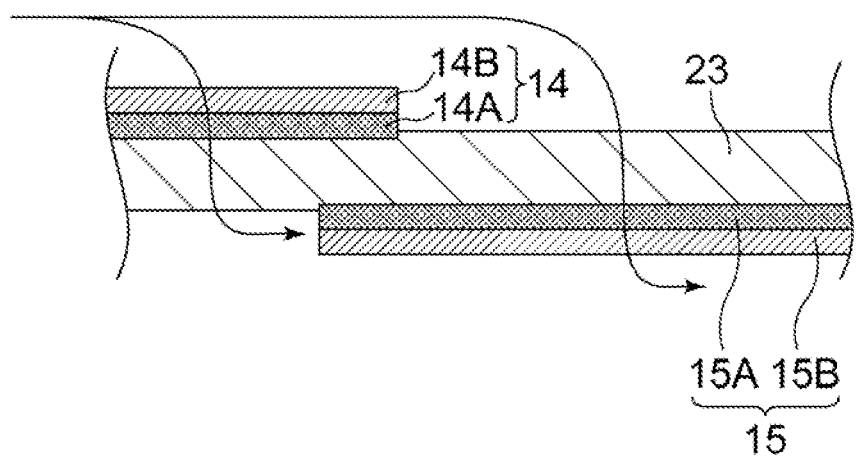
FIG. 5 is a partial enlarged view of a cross section of an exhaust gas purifying catalyst according to yet another embodiment.

In another preferred embodiment of the present invention, both the total number of the reducing catalyst layer(s) and the oxidizing catalyst layer(s) included in the first catalyst portion 14 and the total number of the reducing catalyst layer(s) and the oxidizing catalyst layer(s) included in the second catalyst portion 15 are 2 or more. FIG. 5 shows an example of such a configuration. In an embodiment shown in FIG. 5, an oxidizing catalyst layer and a reducing catalyst layer are present in both the first catalyst portion 14 and the second catalyst portion 15. Accordingly, this configuration can provide an increased probability of contact of exhaust gas with both an oxidizing catalyst layer and a reducing catalyst layer, and the purification performance for the gas species $NO_x$, HC, and CO can be even more readily improved. Moreover, this configuration can readily improve the PM collection rate.

Preferably, a reducing catalyst layer containing Rh is included in each of the first catalyst portion 14 and the second catalyst portion 15. In this case, the proportion of portions where a reducing catalyst layer containing Rh is disposed in the substrate increases when viewed in the X direction, and therefore, the probability of contact of exhaust gas with a reducing catalyst layer containing Rh is effectively increased, so that $NO_x$ purification performance can be significantly improved. Since $NO_x$ emission restrictions have become especially strict in recent years, the exhaust gas purifying catalyst 10 in this case has especially high industrial applicability.

Preferred configurations in the case where a reducing catalyst layer is included in each of the first catalyst portion 14 and the second catalyst portion 15 are configurations (I) and (II) below. According to the embodiment (I) or (II) below, exhaust gas comes into contact with a reducing catalyst layer, an oxidizing catalyst layer, and a reducing catalyst layer in this order. Thus, the supply of a reduction substance to the reducing catalyst layers is facilitated, and the amount of reduction substance that is to be purified through an oxidation reaction decreases. Therefore, oxidation/reduction of exhaust gas proceeds smoothly. These are particularly effective in improving the $NO_x$ reduction efficiency.

(I) The first catalyst portion 14 includes an oxidizing catalyst layer formed on the partition wall 23 and a reducing catalyst layer formed on the surface of the other side of the oxidizing catalyst layer than the partition wall 23-side, and the second catalyst portion includes a reducing catalyst layer formed on the partition wall 23.

(II) The first catalyst portion 14 includes a reducing catalyst layer formed on the partition wall 23, and the second catalyst portion 15 includes an oxidizing catalyst layer formed on the partition wall 23 and a reducing catalyst layer formed on the surface of the other side of the oxidizing catalyst layer than the partition wall 23-side.

In the configurations (I) and (II), it is preferable that each oxidizing catalyst layer contain Pd and that each reducing catalyst layer contain Rh, because exhaust gas purification performance can be improved even more. The reason for this is probably because oxidation of HC and CO by Pd and reduction of $NO_x$ by Rh can be performed in a favorably balanced manner due to the effects of Pd and Rh. Moreover, in the configurations (I) and (II), since a reducing catalyst layer is included in each of the first catalyst portion 14 and the second catalyst portion 15, the reducing catalyst layers are present over a wide area in the exhaust gas purifying catalyst 10 in the X direction. Therefore, $NO_x$ purification can be performed efficiently, and excellent $NO_x$ purification performance is obtained particularly during high speed driving. Thus, the amount of $NO_x$ emitted can be effectively reduced by installing the exhaust gas purifying catalyst 10 in a vehicle.

As described above, an oxidizing catalyst layer or a reducing catalyst layer formed on the partition wall 23 may be formed on the partition wall 23 so as to be in direct contact with the partition wall 23, or may be formed on the partition wall 23 via an intermediate layer. However, the oxidizing catalyst layer or reducing catalyst layer is preferably formed on the partition wall 23 so as to be in direct contact therewith. In particular, in order for an oxidation/reduction reaction to be performed in a balanced manner, it is preferable that an oxidizing catalyst layer that is in direct contact with the partition wall 23 and contains Pd and a reducing catalyst layer that is in contact with the partition wall 23 and contains Rh be arranged with the partition wall 23 therebetween, as in the configuration A or B below.

A: The first catalyst portion 14 includes a reducing catalyst layer that is in direct contact with the partition wall 23 and contains Rh, and the second catalyst portion 15 includes an oxidizing catalyst layer that is in direct contact with the partition wall 23 and contains Pd.

B: The first catalyst portion 14 includes an oxidizing catalyst layer that is in direct contact with the partition wall 23 and contains Pd, and the second catalyst portion 15 contains a reducing catalyst layer that is in direct contact with the partition wall 23 and contains Rh.

The configuration A or B is preferable because the configuration allows an efficient purification reaction in the exhaust gas flow direction of the catalyst 10 throughout.

In order to further improve exhaust gas purification performance, the length L1 (see FIG. 2) of the first catalyst portion 14 in the exhaust gas flow direction is preferably 10% or greater based on the length L (see FIG. 2) of the substrate in the same direction. The length L2 (see FIG. 2) of the second catalyst portion 15 in the exhaust gas flow direction is preferably 30% or greater based on the length L of the substrate in the same direction. Furthermore, it is preferable that L1 be 80% or less based on L and that L2 be 90% or less based on L, because the amounts of catalytically active components and the others can be reduced. In view of these, it is more preferable that L1 be 30% to 60% based on L, and that L2 be 50% to 80% based on L.

The lengths of the first catalyst portion 14 and the second catalyst portion 15 can be measured by the following preferable method: the exhaust gas purifying catalyst 10 is cut in the axis direction of the substrate 11 along a cross section containing the central axis thereof; the central axis portion of the cross section is visually observed to identify the boundary of the first catalyst portion 14 and the boundary of the second catalyst portion 15; and the length of the first catalyst portion 14 and the length of the second catalyst portion 15 are measured. In this case, it is preferable to measure the length of the first catalyst portion 14 and the length of the second catalyst portion 15 at, for example, 10 arbitrarily selected positions on the exhaust gas purifying catalyst 10, and take the average values as the length of the first catalyst portion 14 and the length of the second catalyst portion 15. In the case where it is not possible to determine the boundaries of the first catalyst portion 14 and the second catalyst portion 15 in the exhaust gas flow direction through visual observation, the composition is analyzed at a plurality of (for example, 8 to 16) positions in the exhaust gas flow direction of the exhaust gas purifying catalyst, and the lengths of the first catalyst portion 14 and the second catalyst portion 15 can be determined on the basis of the content of a catalytically active component in the composition at each position. The content of a catalytically active component at each position can be determined through, for example, X-ray fluorescence analysis (XRF) or ICP emission spectroscopic analysis (ICP-AES).

The first catalyst portion 14 is preferably formed so as to extend from the upstream end portion R1 of the substrate 11 in the X direction toward the downstream side in view of both ease of production of the catalyst portion and exhaust gas purification performance. Likewise, the second catalyst portion 15 is preferably formed so as to extend from the downstream end portion R2 of the substrate 11 in the X direction toward the upstream side.

In view of further improving the exhaust gas purification performance of the exhaust gas purifying catalyst 10, the amount of the catalytically active component(s) contained in the first catalyst portion 14 (the total amount of an oxidation catalyst, a reduction catalyst, and other catalytically active components) is generally preferably 0.01 g or more, and more preferably 0.05 g or more per liter of volume of the substrate. The amount of the catalytically active component(s) contained in the second catalyst portion 15 (the total amount of an oxidation catalyst, a reduction catalyst, and other catalytically active components) is generally preferably 0.01 g or more, and more preferably 0.05 g or more per liter of volume of the substrate. For the upper limit, the amount of the catalytically active component(s) contained in the first catalyst portion 14 and the second catalyst portion 15 is preferably 10 g or less per liter of volume of the substrate, and may be 5 g or less, or 3 g/L or less in some cases. As used herein, the volume of the substrate refers to an apparent volume that includes not only the volume of the substrate portion but also the volumes of the first catalyst portion 14, the second catalyst portion 15, the pores of the partition wall 23, and the spaces in the cells 21 and 22.

The amount of Rh contained in a reducing catalyst layer of the first catalyst portion 14 is generally preferably from 0.01 to 1 g, and more preferably from 0.05 to 0.5 g, per liter of volume of the substrate. Also, the total amount of Pd and Pt contained in an oxidizing catalyst layer of the first catalyst portion 14 is generally preferably from 0.1 to 5 g/L, and more preferably from 0.5 to 3 g/L, per liter of volume of the substrate. The same applies to the amount of Rh contained in a reducing catalyst layer of the second catalyst portion 15 and the total amount of Pd and Pt contained in an oxidizing catalyst layer of the second catalyst portion 15.

When a plurality of oxidizing catalyst layers are provided, the mass ratio between the catalytically active components in the plurality of oxidizing catalyst layers is preferably 1:0.3 to 1, and more preferably 1:0.5 to 1. The mass ratio here refers to the ratio of the amount of the catalytically active component in a layer that contains the catalytically active component in the smallest amount to the amount of the catalytically active component in a layer that contains the catalytically active component in the largest amount. The same is also applied mutatis mutandis to the mass ratio between the catalytically active components in the plurality of reducing catalyst layers when a plurality of reducing catalyst layers are provided.

The amount of a catalytically active component can be determined by, for example, completely dissolving a catalyst layer to obtain a solution and measuring the amount of noble metals in the solution using ICP-AES. In the case where a catalyst layer is included in the partition wall of the substrate, the amount of a catalytically active component can be determined by subtracting the amount of noble metals contained in a solution obtained by completely dissolving only the substrate from the amount of noble metals contained in a solution obtained by completely dissolving the catalyst layer and the substrate.

It is preferable that each of the first catalyst portion 14 and the second catalyst portion 15 further contain a catalyst-supporting component, which supports the catalytically active component, in view of causing the catalytically active component to efficiently exhibit exhaust gas purification performance. Metal oxide particles may be used as the catalyst-supporting component. The metal oxide for forming the metal oxide particles may be an inorganic oxide that acts as an oxygen storage component (also referred to as "OSC material"; wherein OSC stands for oxygen storage capacity), or an inorganic oxide other than the oxygen storage component. The term "metal oxide particles" used herein encompasses not only individual particles but also calcined bodies formed of metal oxide particles bonded to each other through calcining.

Herein, a state in which a catalytically active component is "supported" on metal oxide particles refers to a state in which the catalytically active component is physically or chemically adsorbed or held on the outer surfaces of the metal oxide particles or the inner surfaces of the pores of the metal oxide particles. Specifically, whether a catalytically active component is supported on metal oxide particles can be judged in the following manner, for example: a cross section of the exhaust gas purifying catalyst 10 is analyzed using EDS to obtain an element map, and if the presence of a metal oxide component and a catalytically active component is confirmed in the same region of the element map, it is determined that the catalytically active component is "supported" on the metal oxide particles.

As the inorganic oxide as an oxygen storage component, a metal oxide that is multivalent and is capable of storing oxygen can be used. Examples thereof include $CeO_2$ and CZ material (a ceria-zirconia composite oxide containing Ce and Zr, and a solid solution of $CeO_2$ and $ZrO_2$), iron oxide, and copper oxide. An oxide of a rare earth element other than Ce is also preferably used in view of thermal stability. Examples of the oxide of a rare earth element other than Ce include $Sc_2O_3$, $Y_2O_3$, $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. $CeO_2$—$ZrO_2$ herein refers to a solid solution of $CeO_2$ and $ZrO_2$, and whether a solid solution of $CeO_2$ and $ZrO_2$ has been formed can be confirmed by checking whether or not a single phase derived from $CeO_2$—$ZrO_2$ is formed, using an X-ray diffraction (XRD) apparatus. $CeO_2$—$ZrO_2$ may be a solid solution that also contains the oxide of a rare earth element other than Ce. In particular, in view of the balance between heat resistance and OSC, the amount of $CeO_2$ contained in the first catalyst portion 14 or the second catalyst portion 15 is preferably 5 to 40 mass %. The amount of $ZrO_2$ contained in the first catalyst portion 14 or the second catalyst portion 15 is preferably 10 to 80 mass %. The preferred amounts of $CeO_2$ and $ZrO_2$ herein include the amounts of $CeO_2$ and $ZrO_2$ in the form of a solid solution, as well as the amount of Ce, in terms of $CeO_2$, in a ceria-zirconia composite oxide and the amount of Zr, in terms of $ZrO_2$, in a ceria-zirconia composite oxide, respectively.

The amounts of $CeO_2$ and $ZrO_2$ can be determined by, for example, completely dissolving the catalyst layer to obtain a solution, measuring the amounts of Ce and Zr contained in the solution using ICP-AES, and converting them to amounts in terms of oxide. In the case where the catalyst layer is included in the partition wall of the substrate, the amounts of $CeO_2$ and $ZrO_2$ can be determined by subtracting the amounts of Ce and Zr in a solution obtained by completely dissolving only the substrate from the amounts of Ce and Zr contained in a solution obtained by completely dissolving the catalyst layer and the substrate.

The inorganic oxide other than the oxygen storage component that can be contained in the first catalyst portion 14 may be a metal oxide other than the oxygen storage component. Examples thereof include alumina, silica, silica-alumina, titanium, and aluminosilicate. In particular, alumina is preferably used in view of excellent heat resistance. The amount of the inorganic oxide other than the oxygen storage component contained in the first catalyst portion 14 or the second catalyst portion 15 is preferably 4 to 50 mass %.

The amount of alumina can be determined by, for example, completely dissolving the catalyst layer to obtain a solution, measuring the amount of aluminum contained in the solution using ICP-AES, and converting it to an amount in terms of oxide. In the case where the catalyst layer is included in the partition wall of the substrate, the amount of alumina can be determined by subtracting the amount of Al contained in a solution obtained by completely dissolving only the substrate from the amount of Al contained in a solution obtained by completely dissolving the catalyst layer and the substrate.

In view of further improving PM collecting performance and exhaust gas purification performance, the first catalyst portion 14 is preferably present mainly on the surface of the partition wall 23, rather than the inside of the partition wall 23. As used herein, the expression "the first catalyst portion 14 is present mainly on the surface of the partition wall 23" means a state in which, in a cross section of the substrate 11 having the first catalyst portion 14, the mass of the first catalyst portion 14 present on the surface of the partition wall 23 of the substrate 11 is larger than the mass of the first catalyst portion 14 present inside the partition wall 23. For example, whether the first catalyst portion 14 is present mainly on the surface of the partition wall 23 can be checked by observing a cross section of the partition wall where the first catalyst portion 14 is provided, under the above-described scanning electron microscope, and performing an EDS analysis to line-analyze the boundaries between elements (for example, Si and Mg) that are present only in the substrate and elements (for example, Ce and Zr) that are present only in the catalyst layer; or by performing an analysis on a cross section of the partition wall where the first catalyst portion 14 is provided using an electron probe micro analyzer (EPMA). Likewise, the second catalyst portion 15 is preferably present mainly on the surface of the partition wall 23, rather than the inside of the partition wall 23. FIGS. 3 to 5 each schematically show a state in which the first catalyst portion 14 is present mainly on the surface of the partition wall 23 and the second catalyst portion 15 is present mainly on the surface of the partition wall 23.

In order for the first catalyst portion 14 to be present mainly on the surface of the partition wall 23 instead of inside the partition wall 23, for example, metal oxide particles having a particle diameter that makes it difficult for the particles to pass through the pores of the partition wall 23 can be used as the catalyst-supporting metal oxide particles to be included in the first catalyst portion 14 and the second catalyst portion 15. Moreover, the amount of a catalyst layer that is present on the surface of the partition wall 23 can be easily increased relative to the amount of the catalyst layer that is present inside the partition wall 23 by using an organic pore-forming material with a larger particle diameter than the pores of the partition wall 23 when forming the catalyst layer.

Next, a preferred method of producing an exhaust gas purifying catalyst according to the present invention will be described below.

A preferred method of producing the exhaust gas purifying catalyst 10 according to, for example, the embodiment shown in FIG. 3 includes the following steps (1) to (3). For other embodiments, the following method can be modified as appropriate. The step (1) and the steps (2) and (3) may be performed in any order. In the steps (2) and (3), Rh is used as a catalytically active component in one of these steps and Pd or Pt is used as a catalytically active component in the other of these steps.

(1) The step of applying a slurry for forming the first catalyst portion 14 containing a catalytically active component and metal oxide particles at least to a surface of a partition wall 23 that faces an inflow-side cell 21 on the upstream side in the X direction, and then drying or calcining the slurry.

(2) The step of applying a slurry for forming the lower layer for the second catalyst portion 15 containing a catalytically active component and metal oxide particles at least to a surface of the partition wall 23 that faces an outflow-side cell 22 on the downstream side in the X direction, and then drying or calcining the slurry.

(3) The step of applying, after the step (2), a slurry for forming the upper layer for the second catalyst portion 15 containing a catalytically active component and metal oxide particles at least to a part of a portion where the slurry for forming the lower layer for the second catalyst portion 15 has been applied to the surface of the partition wall 23 that faces the outflow-side cell 22, and then drying or calcining the slurry.

As the metal oxide particles, the particles of an inorganic oxide as an oxygen storage component or an inorganic oxide other than the oxygen storage component, which have been described above as a constituent component of the first catalyst portion 14 and the second catalyst portion 15, can be used. The catalytically active components used in the above-described steps may each be in a state of a water-soluble salt such as a nitrate, and thus be mixed with metal oxide particles to obtain a slurry for forming the first catalyst portion 14 and slurries for forming the second catalyst portion 15, and the obtained slurries may be applied to the substrate 11, and then dried or calcined. Alternatively, a catalytically active component may be supported on metal oxide particles in advance, and the resulting metal oxide particles supporting the catalytically active component thereon may be used to form a slurry. For supporting a catalytically active component on metal oxide particles in advance, a method may be used in which the metal oxide particles are impregnated with an aqueous solution of the catalytically active component in a state of a water-soluble salt, and then calcined at a temperature of 350° C. to 550° C.

Each of the above-described slurries may contain a binder for the purpose of attaching the metal oxide particles supporting the catalytically active component to the substrate. Examples of the binder include an alumina sol, a zirconia sol, a titania sol, and a silica sol. Each of the above-described slurries may contain a pore-forming material. As the pore-forming material, cross-linked polymethyl(meth)acrylate particles, cross-linked polybutyl(meth)acrylate particles, cross-linked polystyrene particles, cross-linked polyacrylic acid ester particles, or the like can be used.

In order to apply each of the above-described slurries to the substrate 11, a method may be used in which the upstream side or the downstream side of the substrate 11 in the exhaust gas flow direction is immersed in the slurry. The slurry may be drawn by suction from the other side of the substrate simultaneously with the immersion of the substrate 11. In this manner, the slurry can be applied to a desired position. In all of the above-described steps, the temperature for drying the slurries is preferably 40° C. to 120° C., and the temperature for calcining the slurries is preferably 350° C. to 550° C.

In the exhaust gas purifying catalyst 10 according to the present embodiment, the mass of the first catalyst portion 14 may be tailored according to the amount of the catalytically active component. However, the mass of the first catalyst portions 14 on a dry mass basis is preferably 10 g or more, and more preferably 20 g or more per liter of volume of the substrate in a portion where the first catalyst portions 14 are formed. The mass of the first catalyst portions 14 on a dry mass basis is preferably 80 g or less, and more preferably 60 g or less per liter of volume of the substrate in view of reducing pressure loss and improving exhaust gas purification performance during high speed driving. The mass of the second catalyst portion 15 may be tailored according to the amount of the catalytically active component. However, the mass of the second catalyst portions 15 on a dry mass basis is preferably 20 g or more, and more preferably 30 g or more per liter of volume of the substrate. In order to reduce pressure loss, the mass of the second catalyst portions 15 on a dry mass basis is preferably 80 g or less, and more preferably 60 g or less per liter of volume of the substrate in a portion where the second catalyst portions 15 are formed.

When the first catalyst portion 14 or the second catalyst portion 15 includes two or more, in total, of an oxidizing catalyst layer and a reducing catalyst layer, the mass ratio of the mass of a layer with the largest mass to the mass of a layer with the smallest mass is preferably 1:0.2 to 1, and more preferably 1:0.5 to 1 in view of further improving exhaust gas purification performance.

The exhaust gas purifying catalyst 10 produced in the manner described above can be used in various applications as an exhaust gas purifying catalyst for internal combustion engines that use fossil fuel as a power source, such as gasoline engines, by utilizing the exhaust gas purification performance thereof. The present embodiment can also provide an exhaust gas purification method that uses an exhaust gas purifying catalyst 10 as described above. For example, the exhaust gas purifying catalyst 10 may be provided in an exhaust path of an internal combustion engine such as a gasoline engine, in particular, a GDI engine in a vehicle and used as a GPF or the like, and the exhaust gas from the gasoline engine can thus be favorably purified.

Figure 6:
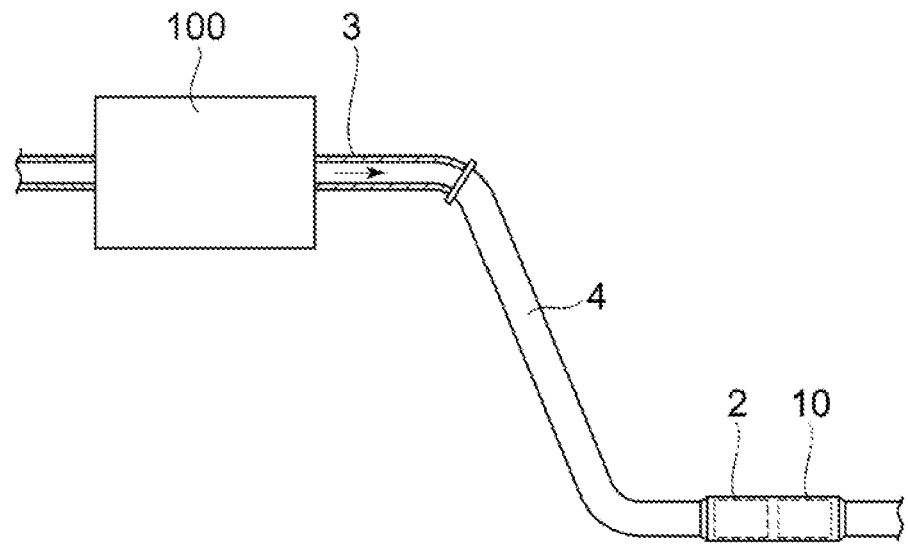
FIG. 6 is a diagram schematically showing a treatment system for purifying an exhaust gas according to an embodiment of the present invention.

FIG. 6 shows an example of a treatment system for purifying an exhaust gas that includes the exhaust gas purifying catalyst 10 of the present invention. The exhaust gas purifying catalyst 10 is provided in an exhaust system of an internal combustion engine. FIG. 6 is a diagram schematically illustrating an internal combustion engine 100 and the exhaust gas purifying catalyst 10 provided in an exhaust system of the internal combustion engine 100.

A gas mixture containing oxygen and a fuel gas is supplied to an engine, which is an internal combustion engine according to the present embodiment. The internal combustion engine burns the gas mixture and converts the combustion energy into mechanical energy. The burnt gas mixture is discharged as exhaust gas into an exhaust system. The internal combustion engine 100 having the configuration shown in FIG. 6 includes mainly a gasoline engine in an automobile. An exhaust manifold 3 is connected to an exhaust port (not shown) via which the internal combustion engine 100 is in communication with the exhaust system. The exhaust manifold 3 is connected to an exhaust pipe 4 through which the exhaust gas flows. The exhaust manifold 3 and the exhaust pipe 4 form a flow path for the exhaust gas from the internal combustion engine 100. The arrow in FIG. 6 indicates the exhaust gas flow direction. The exhaust gas purifying catalyst 10 is provided in the exhaust system of the internal combustion engine 100. A treatment system 1 for purifying an exhaust gas includes the exhaust gas purifying catalyst 10 according to the present embodiment and also includes another exhaust gas purifying catalyst 2 which is not of the present embodiment. The exhaust gas purifying catalyst 10 is located downstream of the other exhaust gas purifying catalyst 2 in the exhaust gas flow direction and provided adjacent to the other exhaust gas purifying catalyst 2. The exhaust gas purifying catalyst 2 is configured to purify three major pollutants ($NO_x$, HC, and CO) contained in exhaust gas. The type of the exhaust gas purifying catalyst 2 is not limited, and, for example, may be a catalyst that supports a noble metal such as platinum (Pt), palladium (Pd), or rhodium (Rd). A catalyst that does not have a wall flow structure can be used as the exhaust gas purifying catalyst 2. The exhaust gas purifying catalyst 10 has PM collecting performance and acts as a GPF.

By the above-described configuration, harmful components in exhaust gas can be effectively purified due to the excellent exhaust gas purification performance of the exhaust gas purifying catalyst 10 without the need to increase the amount of a catalytically active component.

EXAMPLES

Hereinafter, the present invention will be described in further detail by way of examples. However, the scope of the present invention is not limited to the examples. In the following examples and comparative examples, all the drying and calcining steps were performed in an atmosphere. The amounts of catalytically active components used were such that the amounts of respective catalytically active components in catalyst layers were as shown in Table 1. For an oxidizing catalyst layer that was in direct contact with the partition wall 23, the particle diameters of metal oxide particles and a pore-forming material that were used for a second slurry were selected so that the mass of the oxidizing catalyst layer present on the surface of the partition wall 23 of the substrate 11 was larger than the mass of the oxidizing catalyst layer present inside the partition wall 23. For a reducing catalyst layer that was in contact with the partition wall 23 as well, the particle diameters of metal oxide particles and a pore-forming material used for a first slurry were selected in the same manner.

In the examples below, when an oxidizing catalyst layer and a reducing catalyst layer were stacked, both ends of the stacked oxidizing catalyst layer in the X direction were located at substantially the same longitudes as both ends of the stacked reducing catalyst layer in the X direction, respectively (in other words, the oxidizing catalyst layer and the reducing catalyst layer that were stacked had substantially equal lengths).

Example 1

1. Preparation of Slurries

First Slurry

A $CeO_2$—$ZrO_2$ solid solution powder (the $CeO_2$—$ZrO_2$ solid solution contained 15 mass % of $CeO_2$, 70 mass % of $ZrO_2$, and 15 mass % of an oxide of a rare earth element other than Ce) and an alumina powder were provided. The $CeO_2$—$ZrO_2$ solid solution powder and the alumina powder were mixed at a mass ratio of 10:1, and the mixture was impregnated with an aqueous solution of rhodium nitrate.

Next, the resulting mixed solution was mixed with 10 mass % of a pore-forming material (cross-linked polymethyl (meth)acrylate particles), 3 mass % of an alumina sol, and 5 mass % of a zirconia sol, all relative to the solid content of the mixed solution, and also water as a liquid medium, to thereby prepare a first slurry.

Second Slurry

A $CeO_2$—$ZrO_2$ solid solution powder (the $CeO_2$—$ZrO_2$ solid solution contained 40 mass % of $CeO_2$, 50 mass % of $ZrO_2$, and 10 mass % of an oxide of a rare earth element other than Ce) and an alumina powder were mixed at a mass ratio of 3:1, and the mixture was impregnated with an aqueous solution of palladium nitrate.

Next, the resulting mixed solution was mixed with 25 mass % of a pore-forming material (cross-linked polymethyl (meth)acrylate particles), 3 mass % of an alumina sol, 3 mass % of a zirconia sol, all relative to the solid content of the mixed solution, and also water as a liquid medium, to thereby prepare a second slurry.

2. Formation of First Catalyst Portion Before Calcining

As the substrate 11, a substrate was used that had the structure shown in FIG. 1, included 300 cells/inch on a plane perpendicular to the axis direction, each cell being defined by partition walls with a thickness of 200 μm and extending in the axis direction, and had a volume of 1.4 L. In the substrate 11, the opening of a single inflow-side cell 21 formed in the end face on the inflow-side and the opening of a single outflow-side cell 22 formed in the end face on the outflow-side had roughly the same area.

The upstream end portion of the substrate 11 in the exhaust gas flow direction was immersed in the first slurry, and the slurry was drawn by suction from the downstream side. Then, the substrate was dried at 70° C. for 10 minutes. In this manner, layers (first catalyst portions before calcining) were formed of the solid content of the first slurry, each layer being provided on a surface of the partition wall 23 that faced the inflow-side cell 21.

3. Formation of Second Catalyst Portion Before Calcining

The downstream end portion of the dried substrate 11 in the exhaust gas flow direction was immersed in the second slurry, and the slurry was drawn by suction from the upstream side. Then, the substrate was dried at 70° C. for 10 minutes. In this manner, lower layers were formed of the solid content of the second slurry, each lower layer being provided on a surface of the partition wall 23 that faced the outflow-side cell 22.

Next, the downstream end portion of the substrate 11 in the exhaust gas flow direction after the second slurry was dried was immersed in the first slurry, and the first slurry was drawn by suction from the upstream side. Then, the substrate was dried at 70° C. for 10 minutes. In this manner, stacks (second catalyst portions before calcining) were formed, each stack being of the lower layer and an upper layer formed of the solid content of the first slurry.

4. Calcining

After that, the substrate 11 with the layers was fired at 450° C. for one hour for calcining. Accordingly, an exhaust gas purifying catalyst 10 of Example 1, in which the first catalyst portions 14 and the second catalyst portions 15 were formed on the substrate 11, was obtained. Each of the obtained first catalyst portions 14 was a single reducing catalyst layer. Each of the second catalyst portions 15 was a stack of a lower layer 15A, which was an oxidizing catalyst layer, and an upper layer 15B, which was a reducing catalyst layer stacked on the outer surface of the lower layer 15A.

In the exhaust gas purifying catalyst of Example 1, each first catalyst portion 14 of the exhaust gas purifying catalyst 10 was formed on the surface of the partition wall 23 facing the inflow-side cell 21 so as to extend from the upstream end portion R1 toward the downstream side in the exhaust gas flow direction X to 45% of the overall length L, and the mass of the first catalyst portions 14 per volume of the substrate in the portion where the first catalyst portions 14 were formed was 55 g/L on a dry mass basis. In Table 1, the first catalyst portion 14 is indicated as "lower layer" of "first catalyst portion", and the mass of the first catalyst portions 14 was indicated as the "amount of WC" (amount of wash coat).

The lower layer 15A and the upper layer 15B of each second catalyst portion 15 of the exhaust gas purifying catalyst 10 were formed on the surface of the partition wall 23 facing the outflow-side cell 22 so as to extend from the downstream end portion R2 toward the upstream side in the exhaust gas flow direction X to 70% of the overall length L. The mass of the lower layers 15A per volume of the substrate in the portion where the second catalyst portions 15 were formed was 33 g/L on a dry mass basis, and that of the upper layers 15B was 17 g/L on a dry mass basis. In Table 1, the lower layer 15A is indicated as "lower layer" of "second catalyst portion", the upper layer 15B is indicated as "upper layer" of "second catalyst portion", and the mass of each layer is indicated as "amount of WC" (amount of wash coat).

Example 2

An exhaust gas purifying catalyst 10 of Example 2 was obtained in the same manner as in Example 1 except that, in "3. Formation of Second Catalyst Portion Before Calcining", the order in which the first slurry and the second slurry were applied was reversed.

Example 3

An exhaust gas purifying catalyst 10 of Example 3 was obtained in the same manner as in Example 1 except for the following.

In "2. Formation of First Catalyst Portion Before Calcining", the upstream end portion of the substrate 11 in the exhaust gas flow direction was immersed in the second slurry (Pd-containing slurry) and dried. Next, the upstream end portion of the substrate 11 was then further immersed in the first slurry (Rh-containing slurry), the slurry was drawn by suction from the downstream side, and then, the substrate was dried at 70° C. for 10 minutes. In this manner, the lower layer (layer formed of the second slurry) and the upper layer (layer formed of the first slurry) were stacked on the substrate 11. Also, in "3. Formation of Second Catalyst Portion Before Calcining", the downstream end portion of the substrate 11 in the exhaust gas flow direction was immersed in the first slurry, the slurry was drawn by suction from the upstream side, and then the substrate was dried at 70° C. for 10 minutes. In this manner, the lower layer was formed. The upper layer was not formed. Each layer had a mass (amount of WC) shown in Table 1.

Example 4

An exhaust gas purifying catalyst 10 of Example 4 was obtained in the same manner as in Example 1 except that "2. Formation of First Catalyst Portion Before Calcining" in Example 1 was changed to the same steps as those of Example 3.

Comparative Example 1

An exhaust gas purifying catalyst 10 of Comparative Example 1 was obtained in the same manner as in Example 1 except for the following.

In "3. Formation of Second Catalyst Portion Before Calcining" in Example 1, the first slurry (Rh-containing slurry) and the second slurry (Pd-containing slurry) were mixed at a mass ratio of first slurry: second slurry=1:2 in terms of the solid content to obtain a mixed slurry. The downstream end portion of the substrate 11 in the exhaust gas flow direction was immersed in the resulting mixed slurry, the substrate 11 having the first catalyst portions before calcining. The slurry was drawn by suction from the upstream side, and then the substrate was dried at 70° C. for 10 minutes. In this manner, the lower layers were formed. The mass of the lower layers was equal to the total mass of the lower layers 15A and the upper layers 15B of Example 1. The upper layer was not formed.

Comparative Example 2

An exhaust gas purifying catalyst 10 of Comparative Example 2 was obtained in the same manner as in Example 1 except for the following.

In "3. Formation of Second Catalyst Portion Before Calcining" in Example 1, the upper layer was not formed. The mass of the lower layers was equal to the total mass of the lower layers 15A and the upper layers 15B of Example 1.

Comparative Example 3

An exhaust gas purifying catalyst 10 of Comparative Example 3 was obtained in the same manner as in Comparative Example 2 except that the first catalyst portion and the second catalyst portion were interchanged.

The exhaust gas purifying catalysts of Examples and Comparative Examples were evaluated in the following manner.

PM Collecting Performance

A vehicle in which the exhaust gas purifying catalyst 10 was included was driven in accordance with the driving conditions of the Worldwide Harmonized Light Vehicles Test Cycles (WLTC). The number of PM particles contained in the exhaust gas passing through the exhaust gas purifying catalyst, $PN_{cat}$, was counted for each of the following periods: a low speed driving period (from 0 to 589 seconds after the start of driving); a medium speed driving period (from 589 seconds to 1022 seconds after the start of driving); a high speed driving period (from 1022 seconds to 1477 seconds after the start of driving); and an extra-high speed driving period (from 1477 seconds to 1800 seconds after the start of driving). The number of PM particles discharged directly from the engine, $PN_{all}$, was also counted. The PM collection rate was determined by the following equation. The results are shown in Table 1.

PM collection rate (%)=100−($PN_{cat}$/$PN_{all}$)×100

Conditions for Determining PM Collection Rate

Vehicle used for evaluation: 1.5 L gasoline direct injection turbo engine

Gasoline used: fuel for verification test

Apparatus for counting PM: apparatus for counting PM available from HORIBA, Ltd.

Measurement of Amounts of $NO_x$, NMHC, and CO Emitted

Each of the exhaust gas purifying catalysts of Examples and Comparative Examples was placed in an exhaust path of the engine, and the engine with the exhaust gas purifying catalyst were each exposed to the following degradation conditions for a durability test comparable to driving 100,000 to 200,000 kilometers.

Degradation Conditions

Engine used for durability test: 2 L NA gasoline engine for passenger vehicles

Gasoline used: commercially available regular gasoline

Temperature and time for degradation: 900° C., 100 hrs.

After performing the durability test under the above-described conditions, each of the exhaust gas purifying catalysts that had undergone the durability test was installed in a vehicle described below. Next, the vehicle was driven in accordance with the driving conditions of the Worldwide Harmonized Light Vehicles Test Cycles (WLTC). The respective amounts emitted (emission values) of nitrogen oxide ($NO_x$), non-methane hydrocarbon (NMHC), and carbon monoxide (CO) contained in the exhaust gas passing through the exhaust gas purifying catalyst 10 were measured for each of the following periods: a low speed driving period (from 0 to 589 seconds after the start of driving); a medium speed driving period (from 589 seconds to 1022 seconds after the start of driving); a high speed driving period (from 1022 seconds to 1477 seconds after the start of driving); and an extra-high speed driving period (from 1477 seconds to 1800 seconds after the start of driving). The respective total amounts of $NO_x$, NMHC, and CO emitted is shown in Table 1. The amount of NO emitted only in the extra-high speed driving period (from 1477 seconds to 1800 seconds after the start of driving) was also measured. The amount emitted is indicated by "$NO_x$ Ex-high" in Table 1.

Conditions for Determining Purification Rate

Vehicle used for evaluation: 1.5 L gasoline direct injection turbo engine

Gasoline used: fuel for verification test

Apparatus for Analyzing Exhaust gas: available from HORIBA, Ltd.

TABLE 1

| | | First catalyst portion | | | | | | Second catalyst portion | | |
|---|---|---|---|---|---|---|---|---|---|---|
| | | Upper layer | | | Lower layer | | | Upper layer | | |
| | | | Catalytically active component | | | Catalytically active component | | | Catalytically active component | |
| | Number of layers (First catalyst portion/Second catalyst portion) | Type of noble metal | Amount of noble metal [g/L] * | Amount of WC [g/L] * | Type of noble metal | Amount of noble metal [g/L] * | Amount of WC [g/L] * | Type of noble metal | Amount of noble metal [g/L] * | Amount of WC [g/L] * |
| Ex. 1 | 1 layer/2 layers | | — | | Rh | 0.075 | 55 | Pd | 0.90 | 33 |
| Ex. 2 | 1 layer/2 layers | | — | | Rh | 0.075 | 55 | Rh | 0.075 | 17 |
| Ex. 3 | 2 layers/1 layer | Rh | 0.075 | 20 | Pd | 0.90 | 35 | Rh | 0.075 | 50 |
| Ex. 4 | 2 layers/2 layers | Rh | 0.075 | 20 | Pd | 0.45 | 35 | Pd | 0.45 | 33 |
| Com. Ex. 1 | 1 layer/1 layer | | — | | Rh | 0.075 | 55 | Pd + Rh | 0.975 | 50 |
| Com. Ex. 2 | 1 layer/1 layer | | — | | Rh | 0.15 | 55 | Pd | 0.90 | 50 |
| Com. Ex. 3 | 1 layer/1 layer | | — | | Pd | 0.90 | 55 | Rh | 0.15 | 50 |

TABLE 1-continued

| | | Second catalyst portion Lower layer | | | | | | |
|---|---|---|---|---|---|---|---|---|
| | | Catalytically active component | | | | Amount | | |
| | | Type of noble metal | Amount of noble metal [g/L] * | Amount of WC [g/L] * | PM collection [%] | Amount of NO$_x$ emitted [mg/km] | Amount of NO$_x$ Ex-high emitted [mg/km] | Amount of NMHC emitted [mg/km] | Amount of CO emitted [g/km] |
| Ex. 1 | Rh | 0.075 | 17 | 94.3 | 6.03 | 0.543 | 7.02 | 139 |
| Ex. 2 | Pd | 0.90 | 33 | 94.5 | 6.34 | 0.540 | 7.43 | 137 |
| Ex. 3 | — | | | 94.8 | 6.12 | 0.555 | 7.32 | 132 |
| Ex. 4 | Rh | 0.075 | 17 | 96.1 | 5.99 | 0.517 | 6.51 | 130 |
| Com. Ex. 1 | — | | | 82.3 | 7.83 | 0.773 | 8.87 | 177 |
| Com. Ex. 2 | — | | | 85.0 | 7.72 | 0.878 | 8.18 | 150 |
| Com. Ex. 3 | — | | | 86.0 | 7.05 | 0.828 | 8.22 | 149 |

* Weight per volume of substrate

LIST OF REFERENCE NUMERALS

10 Exhaust gas purifying catalyst
11 Substrate
14 First catalyst layer
14A Lower layer
14B Upper layer
15 Second catalyst layer
15A Lower layer
15B Upper layer
21 Inflow-side cell
22 Outflow-side cell
23 Partition wall

The invention claimed is:

1. An exhaust gas purifying catalyst comprising a substrate and catalyst portions provided in the substrate,
the substrate including:
an inflow-side cell which is a space having an open end on an inflow side thereof and a closed end on an outflow side thereof in an exhaust gas flow direction;
an outflow-side cell which is a space having a closed end on an inflow side thereof and an open end on an outflow side thereof in the exhaust gas flow direction; and
a porous partition wall separating the inflow-side cell from the outflow-side cell, and
the catalyst portions including:
a first catalyst portion provided at least on a part of a surface of the partition wall that faces the inflow-side cell; and
a second catalyst portion provided at least on a part of a surface of the partition wall that faces the outflow-side cell,
wherein one of the first catalyst portion or the second catalyst portion includes at least one oxidizing catalyst layer and at least one reducing catalyst layer,
another one of the first catalyst portion or the second catalyst portion includes at least one oxidizing catalyst layer and/or at least one reducing catalyst layer,
the oxidizing catalyst layer is a catalyst layer that contains an oxidation catalyst, the oxidizing catalyst layer contains or does not contain a reduction catalyst or catalytically active components other than the oxidation catalyst and the amount of the oxidation catalyst is larger than the total amount of the reduction catalyst and the catalytically active components other than the oxidation catalyst,
the reducing catalyst layer is a catalyst layer that contains a reduction catalyst, the reducing catalyst layer contains or does not contain an oxidation catalyst or catalytically active components other than the reduction catalyst and the amount of the reduction catalyst is larger than the total amount of the oxidation catalyst and the catalytically active components other than the reduction catalyst, and
the exhaust gas purifying catalyst has a structure I or II below:
I: the first catalyst portion includes the oxidizing catalyst layer in direct contact with the partition wall that faces the inflow-side cell, and the reducing catalyst layer formed on a surface of the oxidizing catalyst layer, which is opposite to a surface of the oxidizing catalyst layer directly contacting the partition wall that faces the inflow-side cell, and the second catalyst portion includes the reducing catalyst layer in direct contact with the partition wall that faces the outflow-side cell; and
II: the first catalyst portion includes the reducing catalyst layer in direct contact with the partition wall that faces the inflow-side cell, and the second catalyst portion includes the oxidizing catalyst layer in direct contact with the partition wall that faces the outflow-side cell, and the reducing catalyst layer formed on a surface of the oxidizing catalyst layer, which is opposite to a surface of the oxidizing catalyst layer directly contacting the partition wall that faces the outflow-side cell.

2. The exhaust gas purifying catalyst according to claim 1,
wherein a total number of oxidizing catalyst layers and reducing catalyst layers included in the first catalyst portion is different from a total number of oxidizing catalyst layers and reducing catalyst layers included in the second catalyst portion.

3. The exhaust gas purifying catalyst according to claim 1, wherein a total number of oxidizing catalyst layers and reducing catalyst layers included in the first catalyst portion and a total number of oxidizing catalyst layers and reducing catalyst layers included in the second catalyst portion are both 2 or more.

4. The exhaust gas purifying catalyst according to claim 1,
wherein a length of the first catalyst portion in the exhaust gas flow direction is 10% to 80% based on a length of the substrate in the exhaust gas flow direction, and
a length of the second catalyst portion in the exhaust gas flow direction is 30% to 90% based on the length of the substrate in the exhaust gas flow direction.

5. The exhaust gas purifying catalyst according to claim 1,
wherein the first catalyst portion and the second catalyst portion each contain an oxygen storage component.

6. The exhaust gas purifying catalyst according to claim 1,
wherein, in the structures I and II, the oxidizing catalyst layer contains Pd and the reducing catalyst layer contains Rh.

7. The exhaust gas purifying catalyst according to claim 1,
wherein catalytically active components in the oxidizing catalyst layer and the reducing catalyst layer are supported by a catalyst-supporting component, and
the catalyst-supporting component contains an oxygen storage component.

\* \* \* \* \*